W. A. WEST.
GUM SOLUTION FOR USE IN ICE CREAM AND PROCESS OF MAKING THE SAME.
APPLICATION FILED OCT. 20, 1916.
1,216,383. Patented Feb. 20, 1917.
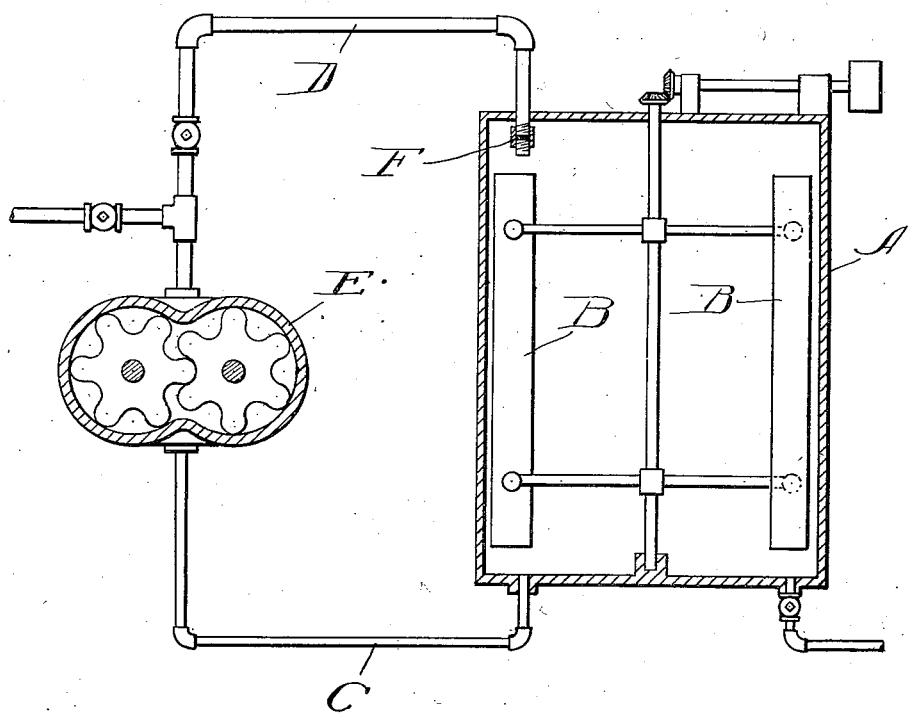

UNITED STATES PATENT OFFICE.

WALTER A. WEST, OF ELKHORN, WISCONSIN.

GUM SOLUTION FOR USE IN ICE-CREAM AND PROCESS OF MAKING THE SAME.

1,216,383.   Specification of Letters Patent.   Patented Feb. 20, 1917.

Application filed October 20, 1916. Serial No. 126,680.

*To all whom it may concern:*

Be it known that I, WALTER A. WEST, a citizen of the United States, residing at Elkhorn, in the county of Walworth and State of Wisconsin, have invented new and useful Improvements in Gum Solutions for Use in Ice-Cream and Processes of Making the Same, of which the following is a specification, reference being had to the accompanying drawings, forming a part thereof.

The purpose of this invention is to provide an edible gum in the form in which it may be conveniently added to cream in the preparation of ice cream and similar dishes. The invention consists in the gum solution and in the process of producing such solution, as hereinafter described and as indicated by the claims. The drawings illustrate a mixing apparatus which may be used in preparing the solution.

In the commercial manufacture of ice cream, in order to give the cream additional "body" and to increase its ability to hold its form after it has been frozen but subjected to ordinary room temperatures, it is common practice to add to the cream a small quantity of gelatin or such a gum as gum tragacanth. This gum, however, can only be dissolved in the cream if it is mixed therewith simultaneously with sugar, the sugar serving to prevent the gum from forming itself into globules which would not thereafter dissolve in the liquid. My invention contemplates making a gum solution which, if desired, may be added to the cream without any accompanying sugar or other substance and which will thoroughly mix with the cream in this condition.

For this purpose I have found most suitable a gum popularly known as India gum and which is the product of a tree called "*Sterculia urens*" commonly grown in and about Bombay, India. This gum is known by various native names, such as "Karai Gond," "Kadaya Gond," "Kadayya" or "Katira" or "Katila Gond." It is non-poisonous, and with proper handling may be dissolved in cold water to form a tasteless mucilaginous solution having little or no adhesive power, but capable of acting as an emulsifying agent. For the present use this gum may be obtained in the form of a dry powder. While a water solution of this gum could be used for the purpose indicated, I prefer to dissolve the gum in skim milk, since the addition of a milk solution of the gum to the cream which is to be used in making ice cream will not serve to dilute the cream as would a water solution.

Although this Karai gum is soluble in cold water or in cold milk, it does not readily dissolve, but requires constant stirring and manipulation to bring about complete solution. I have found that this work can be done mechanically by providing a tank or container, A, with rotary stirring members, B, and connected through the outlet pipe, C, and an inlet pipe, D, with a force pump, E, which may be of the common gear pump variety. The discharge orifice of the inlet pipe, D, is fitted with the wire screen, F, of comparatively large mesh which serves an important function in breaking up the stream of liquid and actually cutting the particles of gum contained therein so that as the liquid is pumped around and around, the circuit composed of the container, A, and the pipes, C and D, the gum material becomes more and more finely sub-divided and more and more thoroughly dissolved in the milk by the stirring operation. The gear pump, E, also assists in the dissolving operation by its grinding action upon the gum in the liquid. The solution may be made of a varying consistency according to the proportion of gum added to a good quantity of milk, but for the use indicated I prefer to dissolve one pound of the gum in powdered form in eight gallons of skim milk which results in a thick syrup solution.

The gum has no chemical reaction with respect to milk or cream, so that when the solution is made up as above described, it may be sealed in bottles and shipped to ice cream makers for use as desired. When the cream or condensed milk which is used in making ice cream has had mixed with it a quantity of this gum solution before the freezing operation, the resulting frozen product has the desired firm and smooth consistency and will retain its form at higher temperatures than would be the case otherwise. If the gum solution is made in the proportions above indicated, it should be added to the cream in a proportion of one part gum solution to ten parts cream.

I claim:—

1. A mucilaginous liquid solution of Karai Gond and milk.

2. A mucilaginous liquid solution of Karai Gond and a liquid which is non-reactive with respect to milk.

3. A mucilaginous liquid solution of wet-ground Karai Gond or gum tragacanth in a liquid which is non-reactive with respect to milk.

4. A mucilaginous liquid solution of wet-ground Karai Gond or gum tragacanth in normally sweet milk.

5. The process of dissolving gum in water or milk which consists in alternately stirring the gum into the liquid and forcing the partially dissolved mixture through means adapted for cutting the gum particles.

6. The process of dissolving gum in water or milk which consists in alternately stirring the gum into the liquid and performing a grinding operation upon the resultant liquid for assisting the solution of the gum particles.

7. The process of dissolving gum in water or milk which consists in alternately stirring the gum into the liquid, performing a grinding operation upon the resultant liquid and forcing said liquid through means adapted for cutting the gum particles.

8. The process of dissolving gum in water or milk which consists in alternately stirring a mixture of powdered gum and the liquid, passing such liquid through means adapted to exert pressure on the particles of gum for reducing their size and feeding the liquid through a screen for further sub-division of the particles by cutting.

9. The process of dissolving gum in water or milk which consists in alternately stirring the gum in powdered form into the liquid, passing the resultant liquid through a gear pump and forcing the passage from such pump through a wire screen for the purposes set forth.

In testimony whereof, I have hereunto set my hand at Chicago, Illinois, this 18th day of October, 1916.

WALTER A. WEST.